(12) United States Patent
Döttling et al.

(10) Patent No.: US 8,903,323 B2
(45) Date of Patent: Dec. 2, 2014

(54) METHODS, APPARATUSES, SYSTEM, AND RELATED COMPUTER PROGRAM PRODUCT FOR REFERENCE SIGNALING

(75) Inventors: Martin Döttling, Neubiberg (DE); Michael Färber, Wolfratshausen (DE); Andreas Lobinger, Grafing (DE); Jürgen Michel, Munich (DE); Bernhard Raaf, Neuried (DE); Ingo Viering, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 558 days.

(21) Appl. No.: 12/988,082

(22) PCT Filed: Apr. 14, 2009

(86) PCT No.: PCT/EP2009/054397
§ 371 (c)(1),
(2), (4) Date: Nov. 30, 2010

(87) PCT Pub. No.: WO2009/127621
PCT Pub. Date: Oct. 22, 2009

(65) Prior Publication Data
US 2011/0092167 A1 Apr. 21, 2011

(30) Foreign Application Priority Data
Apr. 17, 2008 (EP) .................................... 08154723

(51) Int. Cl.
*H04B 17/00* (2006.01)
*H04W 24/10* (2009.01)
*H04W 24/06* (2009.01)

(52) U.S. Cl.
CPC .............. *H04W 24/10* (2013.01); *H04W 24/06* (2013.01)
USPC ........................................ 455/67.11; 455/525

(58) Field of Classification Search
USPC ................... 455/423, 63.1, 67.11, 67.14, 525
See application file for complete search history.

(56) References Cited

U.S. PATENT DOCUMENTS

| | | | | |
|---|---|---|---|---|
| 6,014,565 A | * | 1/2000 | Bonta | 455/437 |
| 6,119,005 A | * | 9/2000 | Smolik | 455/436 |
| 6,442,389 B1 | * | 8/2002 | Marcum | 455/437 |
| 6,556,829 B1 | | 4/2003 | Persson | 455/437 |
| 6,728,540 B1 | * | 4/2004 | DeSantis et al. | 455/437 |
| 7,039,409 B2 | * | 5/2006 | Lobinger et al. | 455/443 |
| 7,840,187 B2 | * | 11/2010 | Ji | 455/63.3 |
| 8,396,477 B2 | * | 3/2013 | Kanazawa et al. | 455/436 |

(Continued)

FOREIGN PATENT DOCUMENTS

| | | |
|---|---|---|
| CN | 1371579 A | 9/2002 |
| CN | 1652628 A | 8/2005 |

(Continued)

*Primary Examiner* — Lewis West
(74) *Attorney, Agent, or Firm* — Harrington & Smith (57) ABSTRACT

It is disclosed a method including creating inquiry information related to an evaluation of at least one network terminal, and transmitting the created inquiry information in a long-range reference signal; a method including receiving the inquiry information in the long-range signal, establishing, based on the received inquiry information, report information related to a quality of the long-range reference signal, and transmitting the established report information; and a method including receiving the report information, and evaluating, based on the received report information, at least one network terminal.

30 Claims, 3 Drawing Sheets

(56) References Cited

U.S. PATENT DOCUMENTS

| | | | |
|---|---|---|---|
| 8,462,730 B2* | 6/2013 | Sekiya | 370/331 |
| 8,503,938 B2* | 8/2013 | Laroia et al. | 455/63.1 |
| 8,676,223 B2* | 3/2014 | Montojo et al. | 455/452.2 |
| 2002/0186461 A1 | 12/2002 | Corbaton et al. | 375/231 |
| 2004/0121773 A1 | 6/2004 | O'Brien | 455/438 |
| 2006/0223538 A1* | 10/2006 | Haseba et al. | 455/436 |
| 2007/0025384 A1* | 2/2007 | Ayyagari et al. | 370/445 |
| 2007/0105562 A1* | 5/2007 | Ji | 455/452.1 |
| 2007/0218904 A1* | 9/2007 | Park et al. | 455/436 |
| 2008/0004023 A1* | 1/2008 | Chen et al. | 455/436 |
| 2008/0214199 A1* | 9/2008 | Ji | 455/452.1 |
| 2008/0259811 A1* | 10/2008 | Cordeiro et al. | 370/252 |
| 2009/0325569 A1* | 12/2009 | Chou | 455/422.1 |
| 2010/0046470 A1* | 2/2010 | Sekiya | 370/331 |
| 2010/0113030 A1* | 5/2010 | Kanazawa et al. | 455/437 |

FOREIGN PATENT DOCUMENTS

| WO | WO 2007/031956 A2 | 3/2007 |
|---|---|---|
| WO | WO 2007/050729 A1 | 5/2007 |
| WO | WO 2007/100230 A1 | 9/2007 |

* cited by examiner

METHODS, APPARATUSES, SYSTEM, AND RELATED COMPUTER PROGRAM PRODUCT FOR REFERENCE SIGNALING

FIELD OF THE INVENTION

The present invention relates to reference signaling. More specifically, the present invention relates to methods, apparatuses, a system and a related computer program product for reference signaling e.g. in mobile radio access networks.

BACKGROUND

In current and future radio access networks, a lot of optimization may be performed while the network is in an active state.

There have also been discussions of some of these optimization topics. These topics are discussed in the general framework of 3GPP standardization collected as SON (self-optimizing networks).

In current standards, there are reference signals and measurements for cell identification and neighbor cell measurements. Most of these measurement cases utilize reference signals that are bound—by technology and standard—and for interference issues to certain power conditions.

There have been approaches for overcoming the above limitations chiefly directed to averaging and coherent detection, which can lead to long range cell detection. For example, there has been conceived the usage of so-called 'beacon' and/or 'single carrier' and/or 'bang' signal and use cases, or the usage of so-called 'double-carrier' signal.

In consideration of the above, it is an object of the present invention to overcome one or more of the above drawbacks. In particular, the present invention provides methods, apparatuses, a system and a related computer program product for reference signaling.

According to the present invention, in a first aspect, this object is for example achieved by a method comprising:

creating inquiry information related to an evaluation of at least one network terminal; and transmitting the created inquiry information in a long-range reference signal.

According to further refinements of the invention as defined under the above first aspect, the method further comprises receiving, prior to the creating, a configuration signal indicating usage of the long-range reference signal.

According to the present invention, in a second aspect, this object is for example achieved by a method comprising:

receiving inquiry information related to an evaluation of at least one network terminal in a long-range signal;

establishing, based on the received inquiry information, report information related to a quality of the long-range reference signal; and transmitting the established report information.

According to the present invention, in a third aspect, this object is for example achieved by a method comprising:

receiving, report information related to a quality of a long-range reference signal; and evaluating, based on the received report information, at least one network terminal.

According to further refinements of the invention as defined under the above third aspect, the method further comprises generating, prior to the receiving, a configuration signal indicating usage of the long-range reference signal, and transmitting, prior to the receiving, the generated configuration signal.

According to further refinements of the invention as defined under the above first to third aspects, the configuration signal comprises one of separate orthogonal parts of a resource block for the network terminal and a temporal sequence cycling through a plurality of the network terminals;

the inquiry information comprises at least one of the following: identity information of a management entity having created the inquiry information, selection information for selecting at least one of the at least one network terminal to transmit the report information; and resource information related to a resource by means of which the at least one network terminal is to transmit the report information;

the inquiry information further comprises an extension for selecting network terminals being in an idle state;

the report information further comprises location information of the at least one network terminal;

the method further comprises obtaining the location information using one of signal timing advance, neighbor measurements, relative received signal quality and global positioning system information.

According to the present invention, in a fourth aspect, this object is for example achieved by an apparatus comprising:

means for creating inquiry information related to an evaluation of at least one network terminal; and means for transmitting the inquiry information created by the means for creating in a long-range reference signal.

According to further refinements of the invention as defined under the above fourth aspect, the apparatus further comprises means for receiving a configuration signal indicating usage of the long-range reference signal.

According to the present invention, in a fifth aspect, this object is for example achieved by an apparatus comprising:

means for receiving inquiry information related to an evaluation of at least one network terminal in a long-range signal;

means for establishing, based on the inquiry information received by the means for receiving, report information related to a quality of the long-range reference signal; and means for transmitting the report information established by the means for establishing.

According to the present invention, in a sixth aspect, this object is for example achieved by an apparatus comprising:

means for receiving report information related to a quality of a long-range reference signal; and means for evaluating, based on the report information received by the means for receiving, at least one network terminal.

According to further refinements of the invention as defined under the above sixth aspect, the apparatus further comprises means for generating a configuration signal indicating usage of the long-range reference signal, wherein the means for transmitting is further configured to transmit the configuration signal generated by the means for generating.

According to further refinements of the invention as defined under the above fourth to sixth aspects, the configuration signal comprises one of separate orthogonal parts of a resource block for the network terminal and a temporal sequence cycling through a plurality of the network terminals;

the inquiry information comprises at least one of the following: identity information of a management entity having created the inquiry information, selection information for selecting at least one of the at least one network terminal to transmit the report information, and resource information related to a resource by means of which the at least one network terminal is to transmit the report information;

the inquiry information further comprises an extension for selecting network terminals being in an idle state;

the report information further comprises location information of the at least one network terminal;

the apparatus further comprises means for obtaining the location information using one of signal timing advance, neighbor measurements, relative received signal quality and global positioning system information;

at least one, or more of means for transmitting, means for receiving, means for creating, means for establishing, means for evaluating, means for generating, means for obtaining and the apparatus is implemented as a chipset or module.

According to further refinements of the invention as defined under the above fourth aspect, the apparatus is constituted by a node B associated with a center cell of a plurality of cells.

According to further refinements of the invention as defined under the above fifth aspect, the apparatus is constituted by one of a user equipment and a terminal.

According to further refinements of the invention as defined under the above sixth aspect, the apparatus is constituted by at least one of a node B associated with at least one cell neighboring a center cell and a management entity.

According to the present invention, in a seventh aspect, this object is for example achieved by a system comprising:

at least one apparatus according to the fourth aspect;
at least one apparatus according to the fifth aspect; and
an apparatus according to the sixth aspect.

According to the present invention, in an eighth aspect, this object is for example achieved by a computer program product comprising code means for performing methods steps of a method according to any one of the first to third aspects, when run on a processing means.

In this connection, it has to be pointed out that the present invention enables one or more of the following:

enabling a running system to obtain information about other cells, especially non-adjacent ones;

providing reference signals strong enough for measuring over long-range, further than the adjacent cell.

BRIEF DESCRIPTION OF THE DRAWINGS

An embodiment of the present invention is described herein below with reference to the accompanying drawings, in which.

DETAILED DESCRIPTION OF THE PRESENT INVENTION

Embodiments of the present invention are described herein below by way of example with reference to the accompanying drawings.

It is to be noted that for this description, the terms "ID of the management entity, information to select UEs for measurement reporting, implicit information of the resources and the extension for use UEs in idle mode; quality of a long-range signal and user equipment" are examples for "inquiry information; report information and network terminal", respectively, without restricting the latter-named terms to the special technical or implementation details imposed to the first-named terms.

Figure 1:
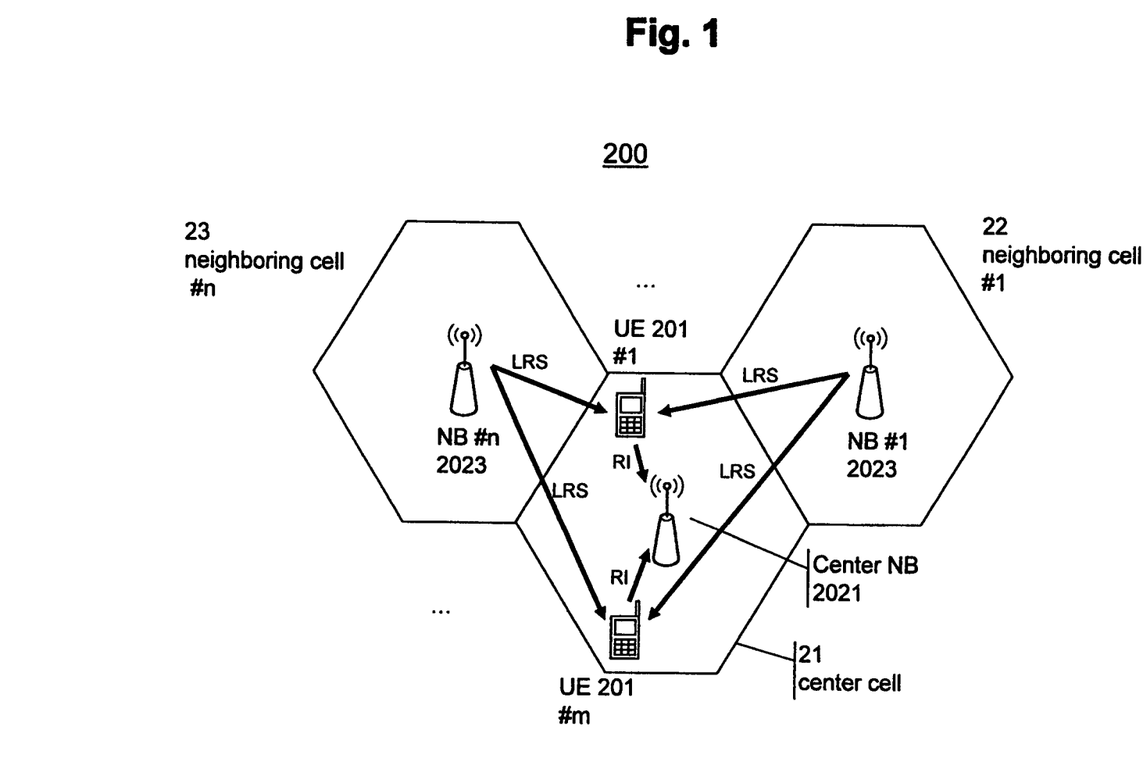
FIG. 1 shows a cell-based network schematically, in which examples of the present invention may be applied.

FIG. 1 shows a cell-based network schematically, in which examples of the present invention may be applied. As shown in FIG. 1, a communication network 200 may be divided in a center cell 21 and neighboring cells 22, 23 neighboring the center cell 21. For the sake of simplicity, only two neighboring cells 22, 23 are shown in FIG. 1, while remaining four neighboring cells are not shown. Furthermore, it is to be noted that the hexagonal shape of the cells shown in FIG. 1 does not restrict the cell shape. According to given requirements and mathematical models, any suitable cell model may be applied. In this context, the number n (n being an integer equal to or greater than 1) of neighboring cells may be selected appropriately.

The center cell 21 comprises a center NB 2021 and m (m being an integer equal to or greater than 1) UEs 201, wherein in FIG. 1, only the case of m=2 (UE 201 #1 and UE 201 #m) is shown. Further, each neighboring cell 22, 23 comprises a respective NB 2023.

As shown in FIG. 1, e.g. the NBs 2023 of the neighboring cells transmit a long-range signal (occasionally abbreviated as "LRS" hereinafter) (to be described later) to the UEs 201 in the center cell 21. The LRS may comprise inquiry information (to be described later). Based on the received LRS, each of the UEs 201 may establish report information (occasionally abbreviated as "RI" hereinafter) (to be described later) e.g. related to the quality of the received LRS and transmit the RI to the center NB 2021. It is to be noted that although FIG. 1 depicts the neighboring cells 22, 23 as cells adjacent to the center cell, the term "neighboring" may also refer to cells having a greater distance to the center cell than the adjacent cells.

The center NB 2021 may relay the gathered RI of the UEs 201 e.g. to a management entity (not shown in FIG. 1) which may then evaluate e.g. the network coverage by evaluating the UEs.

Figure 2:
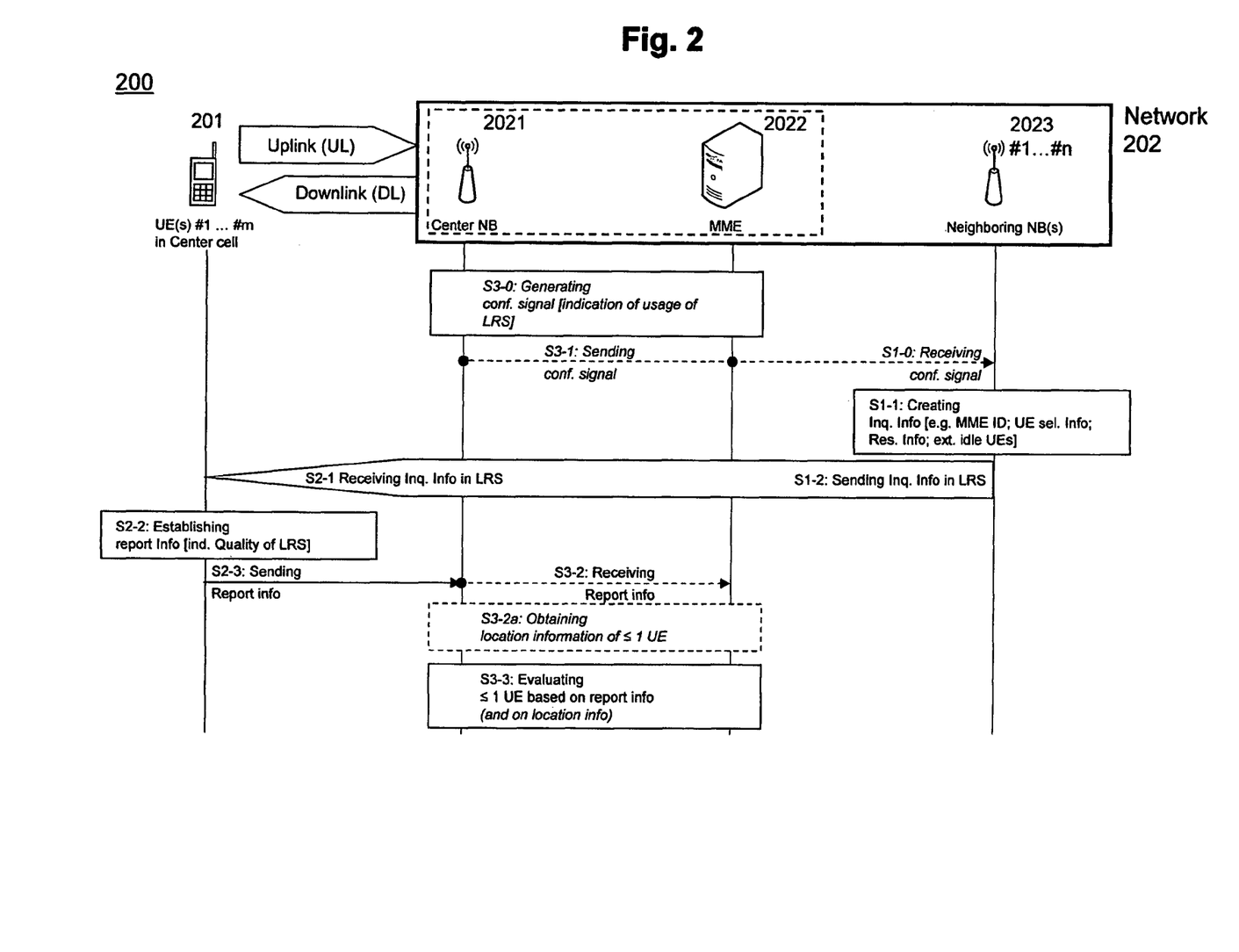
FIG. 2 shows methods according to examples of the present invention.

FIG. 2 shows a method according to examples of the present invention for reference signaling. Signaling between elements is indicated in horizontal direction, while time aspects between signaling may be reflected in the vertical arrangement of the signaling sequence as well as in the sequence numbers. It is to be noted that the time aspects indicated in FIG. 2 do not necessarily restrict any one of the method steps shown to the step sequence outlined. This applies in particular to method steps that are functionally disjunctive with each other. Within FIG. 2, for ease of description, means or portions which may provide main functionalities are depicted with solid functional blocks or arrows and a normal font, while means or portions which may provide optional functions are depicted with dashed functional blocks or arrows and an italic font.

As shown in FIG. 2, the communication network 200 may comprise the UE(s) 201 and a network 202. The network 202 in turn may comprise the center NB 2021, a management entity 2022 (abbreviated as "MME" hereinafter) and the neighboring NB(s) 2023. The center NB 2021 and the MME 2022 may also be disposed as an integral entity, as indicated by the dashed box surrounding the functional blocks of the center NB 2021/MME 2022. In the following, the term "NB 2021/MME 2022" is used for referring to either ones of NB 2021 and MME 2022.

As optional preparatory measures, in step S3-0, e.g. the center NB 2021/MME 2022 may perform generating a configuration signal e.g. indicating intended usage of the long-range reference signal. Then, e.g. the NB 2021/MME 2022 may perform transmitting the generated configuration signal, which configuration signal may then be received e.g. by the neighboring NB(s) 2023 in step S1-0. The configuration signal may comprise separate orthogonal parts of a resource block for the network terminals or a temporal sequence cycling through a plurality of the network terminals.

Then, in step S1-1, e.g. the neighboring NB(s) 2023 may perform creating inquiry information (e.g. MME identifier, UE selection information, resource information or an extension relating to idle UE(s) 201) related to an evaluation of at least one network terminal (e.g. UE(s) of the center NB).

In step S1-2, e.g. the neighboring NB(s) 2023 may perform transmitting the created inquiry information e.g. in a long-range reference signal. In step 2-1, e.g. the UE(s) 201 may perform receiving the inquiry information.

Then, in step S2-2, e.g. the UE(s) 201 may perform establishing, based on the received inquiry information, report information related to a quality of the long-range reference signal.

The inquiry information may comprise identity information of a management entity (e.g. MME 2022) having created the inquiry information, selection information for selecting at least one of the at least one network terminal (e.g. UE(s) 201) to transmit the report information and/or resource information (e.g. time and frequency) related to a resource by means of which the at least one network terminal (e.g. one of the UE(s) 201) is to transmit the report information. The inquiry information may further comprise an extension for selecting network terminals (e.g. UE(s) 201) being in an idle state.

In step S2-3, e.g. the UE(s) 201 may perform transmitting the established report information. In step S3-2, e.g. the center NB 2021/MME 2022 may perform receiving the report information.

Then, in step S3-3, e.g. the center NB 2021/MME 2022 may perform evaluating, based on the received report information, the at least one network terminal (e.g. the UE(s) 201).

The report information may further comprise location information of the at least one network terminal. Furthermore, the above-defined method relating to the center NB 2021/MME 2022 may also comprise obtaining, in an optional step S3-2a, the location information using one of signal timing advance, neighbor measurements, relative received signal quality and global positioning system information.

Figure 3:
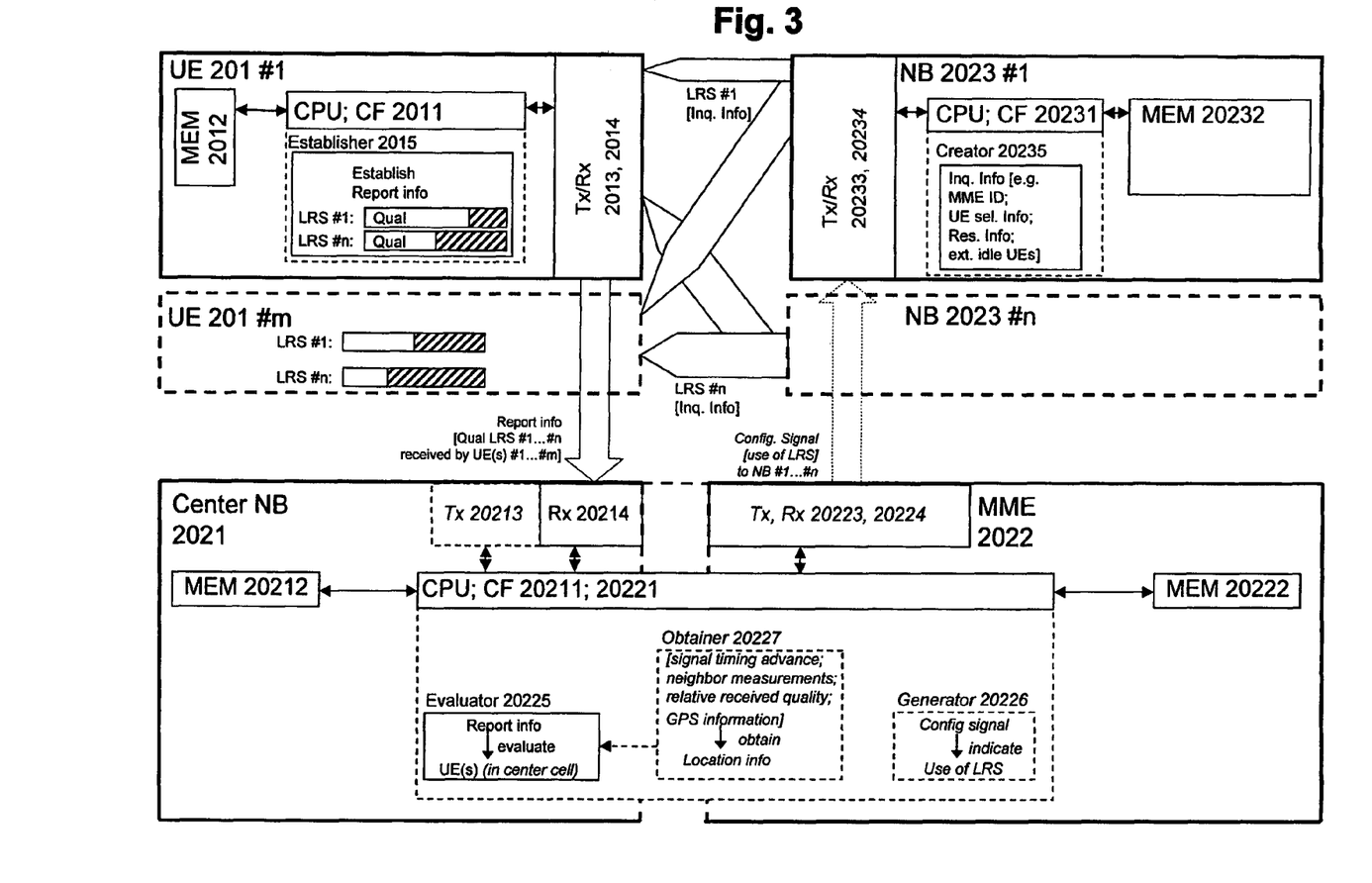
FIG. 3 shows apparatuses (e.g. a center NB (node B), a neighboring NB(s) and UE(s) (user equipment)) according to examples of the present invention.

FIG. 3 shows embodiments of respective apparatuses (e.g. UE(s) 201, center BS 2021, MME 2022 and NB(s) 2023) for reference signaling according to examples of the present invention. Within FIG. 3, for ease of description, means or portions which may provide main functionalities are depicted with solid functional blocks or arrows and a normal font, while means or portions which may provide optional functions are depicted with dashed functional blocks or arrows and an italic font.

The UE 201 #1 may comprise a central processing unit CPU or core functionality CF (referred to as "CPU" hereinafter) 2011, a memory 2012, a transmitter (or means for transmitting) Tx 2013, a receiver (or means for receiving) Rx 2014 and an establisher (or means for establishing) 2015.

Furthermore, also each of the UE(s) 201 #2 to #m may also comprise the CPU 2011, the memory 2012, the transmitter (or means for transmitting) Tx 2013, the optional receiver (or means for receiving) Rx 2014 and the establisher (or means for establishing) 2015, wherein only the full configuration for UE 201 #1 is shown in FIG. 3 for simplification of illustration.

The center NB 2021 may comprise a CPU (or core functionality CF) 20211, a memory 20212, an optional transmitter (or means for transmitting) 20213 and a receiver (or means for receiving) 20214. The MME 2022 may comprise a CPU 20221, a memory 20222, an optional transmitter (or means for transmitting) Tx 20223, an optional receiver (or means for receiving) Rx 20224, an evaluator (or means for evaluating) 20225, an optional generator (or means for generating) 20226 and an optional obtainer (or means for obtaining) 20227. It is to be noted that the CPUs 20211 and 20221 of the center NB 2021 may be disposed as an integral entity (as shown in FIG. 3) or may alternatively be disposed as separate entities. As indicated by the dashed extension of the functional block of the CPUs 20211 and 20221, the means for evaluating 20225, the optional means for generating 20226 and the optional means for obtaining 20227 may be functionalities running on the CPUs 20211 and 20221 or may alternatively be separate functional entities or means. Furthermore, all the means 20225 to 20227 are interchangeably disposable between the center NB 2021 and the MME 2022, no matter whether the center NB 2021 and the MME 2022 are disposed as separate entities or as a single/combined entity.

Furthermore, each of the NB(s) 2023 #1 to #n may comprise a CPU 20231, a memory 20232, a transmitter (or means for transmitting) Tx 20233 and an optional receiver (or means for receiving) Rx 20234, wherein only the full configuration for NB 2023 #1 is shown in FIG. 3 for simplification of illustration.

The CPUs 20x1 (wherein x=1, 21, 22 and 23) may respectively be configured to process various data inputs and to control the functions of the memories 20x2, the means for transmitting 202x3 and the means for receiving 20x4 (and the means for establishing 2015 of the UE(s) 201, the means for evaluating 20225, the optional means for generating 20226 and the optional means for obtaining 20227 of the center NB 2021/MME 2022 and the means for creating 20235 of the NB(s) 2023). The memories 20x2 may respectively serve e.g. for storing code means for carrying out e.g. the respective method according to the invention, when run e.g. on the CPUs 20x1. It is to be noted that the (optional) means for transmitting 20x3 and the (optional) means for receiving 20x4 may alternatively be provided as respective integral transceivers (as shown e.g. in the transceivers 20223, 20224 of the NB(s) 2023 or the transceiver 20233, 20234 of the UE 201 #1). In turn, those transceivers may also be disposed as separate transmitters and receivers. It is further to be noted that the transmitters/receivers may be implemented i) as physical transmitters/receivers for transceiving e.g. via the air interface (e.g. in case of transmitting between the UE(s) 201 and center NB 2021 or between the NB(s) 2023 and the UE(s) 201), ii) as routing entities e.g. for transmitting/receiving data packets e.g. in a PS (packet switched) network (e.g. between center NB 2021 and MME 2022 when disposed as separate network entities), iii) as functionalities for writing/reading information into/from a given memory area (e.g. in case of shared/common CPUs or memories e.g. of center NB 2021 and MME 2022 when disposed as an integral network entity), or iv) as any suitable combination of i) to iii).

Furthermore, as indicated by the dashed connections between the functional blocks of the center NB 2021 and MME 2022, it is to be noted that the center NB 2021 and MME 2022 may also be implemented as an integral/combined entity, as mentioned above. In that case, the CPUs 20211, 20221, the memories 20212, 20222, the (optional) means for transmitting 20213, 20223 and the (optional) means for receiving 20234, 20244 may respectively be common and/or shared resources.

For example, as optional preparatory measures, e.g. the optional means for generating 20226 of the center NB 2021/

MME 2022 may perform generating a configuration signal e.g. indicating intended usage of the long-range reference signal. Then, e.g. the means for transmitting 20223 of the NB 2021/MME 2022 may perform transmitting the generated configuration signal, which configuration signal may then be received e.g. by the means for receiving 20234 of the neighboring NB(s) 2023. The configuration signal may comprise separate orthogonal parts of a resource block for the network terminals or a temporal sequence cycling through a plurality of the network terminals.

Then, e.g. the means for creating 20235 of the neighboring NB(s) 2023 may perform creating inquiry information (e.g. MME identifier, UE selection information, resource information or an extension relating to idle UE(s) 201) related to an evaluation of at least one network terminal (e.g. UE(s) of the center NB).

E.g. the means for transmitting 20233 of the neighboring NB(s) 2023 may perform transmitting the created inquiry information e.g. in a long-range reference signal. E.g. the means for receiving 2014 of the UE(s) 201 may perform receiving the inquiry information.

Then, e.g. the means for establishing 2015 of the UE(s) 201 may perform establishing, based on the received inquiry information, report information related to a quality of the long-range reference signal. For descriptive purposes, the quality of the received LRS is indicated in the UE 201 #1 and UE 201 #m FIG. 3 with portions of empty blocks in relation to hatched blocks. For example, UE 201 #1 may establish e.g. a quality of LRS #1 of 75% of the full signal strength, and a quality of LRS #n of 50% of the full signal strength, while UE 201 #m may establish e.g. a quality of LRS #1 of 50% of the full signal strength, and a quality of LRS #n of 33% of the full signal strength.

The inquiry information may comprise identity information of a management entity (e.g. MME 2022) having created the inquiry information, selection information for selecting at least one of the at least one network terminal (e.g. UE(s) 201) to transmit the report information and/or resource information (e.g. time and frequency) related to a resource by means of which the at least one network terminal (e.g. one of the UE(s) 201) is to transmit the report information. The inquiry information may further comprise an extension for selecting network terminals (e.g. UE(s) 201) being in an idle state.

E.g. the means for transmitting 2013 of the UE(s) 201 may perform transmitting the established report information. Then, e.g. the means for receiving 20214 of the center NB 2021/MME 2022 may perform receiving the report information.

Then, e.g. the means for evaluating 20225 of the center NB 2021/MME 2022 may perform evaluating, based on the received report information, the at least one network terminal (e.g. the UE(s) 201).

The report information may further comprise location information of the at least one network terminal. Furthermore, the above-defined center NB 2021/MME 2022 may also comprise optional means for obtaining 20227 for obtaining the location information using signal timing advance, neighbor measurements, relative received signal quality or global positioning system information.

Furthermore, at least one of, or more of the means for transmitting 20x3, means for receiving 20x4 (wherein x=1, 21, 22 and 23), means for creating 20235, means for establishing 2015, means for evaluating 20225, means for generating 20226, means for obtaining 20227 and the UE(s) 201, the center NB 2021, the MME 2022 and/or the NB(s) 2023, or the respective functionalities carried out, may be implemented as a chipset or module.

Finally, the present invention also relates to a system which may comprise at least one of the UE(s) 201, at least one NB 2023, and a center NB 2021 and/or a MME 2022.

Without being restricted to the details following in this section, the embodiment of the present invention may be summarized as follows:

To enable a long-range cell detection, an additional reference signal with certain time and frequency characteristics is configured in an already available time and frequency multiplexed system.

In an OFDM (orthogonal frequency division multiplexing) system similar to LTE (long term evolution) DL (downlink), the available DL resources are blocks in time and frequency domain. To enable a long range reference signal, the DL may be utilized in such a way that (a lot) more than the average transmit power is put into 1 resource, at the extreme point of a single 'tone' allocation.

To do this, in an already available system a process like the following may be initiated:

A management entity (SON element manager) decides for a measurement cycle

The control plane signals the configuration of a single or set of resource block(s) taken out of the shared pool in the DL-SCH (or even from the reference signals (pilot)) to single or group of (at the best case synchronized) NodeB(s)

The control plane signals a single/set of UE(s) a measurement (in advance/at a certain time) for the long range reference signal.

The NodeB(s) schedule the resource blocks accordingly and transmit the long range signal.

The UE measures the reference signal especially with a matched filter for strongest correlation The UE reports the measurement for the long range signal to their attached NodeB The NodeB(s) report to the management entity An extension to the above may use a specialized long-range reference signal that carries also a small information package that transmits one of the (and/or a combination of) the following information:

ID of the management entity. This enables the NodeB that receives the measurement report to route the measurement report to the matching management entity. That even could overcome collisions of measurement cycles.

Information to select UEs for measurement reporting. This could replace step c) in the above process and enable an implicit signaling of the selection of reporting UEs.

Implicit information of the resources (time and frequency) in the UL (RACH) where the measurement report should be transmitted by the UE the above one, with the extension that so also UEs in idle mode can be utilized for long-range reference signal detection.

Focusing on the reference signal itself:

In the current standard (LTE, OFDM-A in DL), this has not been included, but the utilization of the P-DLSCH (Physical downlink shared channel) and the introduction of scheduling enables to free resource blocks to put additional and/or replacement of already available signals on the air.

In a possible implementation, the above invention can be used to detect potential coverage holes, which would be created in a mobile network in case one cell will be not available, either due to fault or due to intentional switching off for energy saving reasons. In the latter case, if may be detected whether coverage holes would result prior to switching off in order to prevent negative impact on user perception.

In this particular implementation, the management entity advises a particular center cell and all its neighbors not to schedule any data in a particular resource block. Instead, it configures all neighbor cells to send the long-range signal. This can either be done using separate orthogonal parts of the resource block for the neighboring cells concurrently, or in a temporal sequence cycling through all the neighbor cells and using the same part of the resource block. Further, feedback from the measuring UEs for all the neighboring cells may be obtained.

The UEs of the center cell may receive the measurement request and report to the center cell the received quality of the long-range signals. The measurement results may be sent to the management entity by the center cell. The management entity can then evaluate whether UEs could be covered by neighboring cell and in particular detect UEs that cannot be covered by any neighboring cell.

Fastest convergence to significant statistics (i.e. enough measurements that most likely correspond to all relevant positions in the coverage area of the center cell) while at the same time not causing any impact on the network performance and capacity may be achieved by configuring these measurements in time where the center cell has notable load, but the center cell and neighboring cell load is such that the required resource block for the measurement can be reserved without any impact on user performance.

A further improvement of the algorithm in the management entity may improve the management entity's knowledge whether the relevant part of the center cell coverage area has been measured using additional information, which allows locating the UEs which are doing the measurements (here the whole range from rough location information based on timing advance, neighbor measurements and their relative received quality, up to precise GPS-based location information can be used).

In order to maximize the detectable area of the long-range signal power reduction can be applied in the cell which is to be switched off, and high power may be used at the neighboring cells transmitting the long-range signal.

Further, some additional measurement statistics from the cell could help to evaluate, how often users connect to the site and are in the very close vicinity, e.g. based on location information (examples of location information detailed above).

Furthermore, if not all cells of one site are switched off, these close-by areas could be covered by the neighboring sectors despite of the back-lobe attenuation (as the path loss will be very small).

One strategy could therefore be to switch of cells of one site sequentially and tracking measurements and network status before switching off a further cell. This would allow reacting to increase of problems, such as radio link failures. Furthermore, a more gradual change of the network will improve stability and reduce e.g. handover rates due to changing coverage areas.

Further Embodiments

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), Blue-Tooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the UE and/or the eNB, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. UE(s), center NB, neighboring NB(s) and/or MME and their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "UEs" represents "user equipments" and "NBs" represents "Nodes B" or "NodeBs", respectively.

3GPP 3rd generation partnership project
DL Downlink
UL Uplink
NB Node B
LTE Long term evolution
P-DLSCH Physical downlink shared channel
SON self organizing networks
RACH Random Access Channel
UE User Equipment

The invention claimed is:

1. A method, comprising:
   receiving, by at least one neighboring cell of a center cell, a configuration signal indicating usage of a long-range reference signal measurable over a range beyond that of the range to adjacent cells;
   creating by at the least one neighboring cell, inquiry information related to an evaluation of at least one network terminal in the center cell; and
   transmitting by the at least one neighboring cell, the created inquiry information in the long-range reference signal to the at least one network terminal in the center cell.

2. The method according claim 1, further comprising receiving the configuration signal from the center cell.

3. The method according to claim 2, wherein the configuration signal comprises one of separate orthogonal parts of a resource block for the network terminal and a temporal sequence cycling through a plurality of the network terminals.

4. The method according to claim 1, wherein the inquiry information comprises at least one of the following: identity information of a management entity having created the inquiry information; selection information for selecting at least one of the at least one network terminal to transmit the report information; and resource information related to a resource by means of which the at least one network terminal is to transmit the report information.

5. The method according claim 4, wherein the inquiry information further comprises an extension for selecting network terminals being in an idle state.

6. The method according to claim 4, wherein the report information further comprises location information of the at least one network terminal.

7. The method according to claim 6, further comprising obtaining the location information using one of signal timing advance, neighbor measurements, relative received signal quality and global positioning system information.

8. A non-transitory computer readable medium storing a program of instructions, execution of which by a processor configures an apparatus to performing methods steps of a method according to claim 1.

9. A method, comprising:
   receiving in a long-range signal from at least one neighboring cell of a center cell, inquiry information related to an evaluation of at least one network terminal in the center cell, wherein the at least one neighboring cell receives a configuration signal indicating usage of the long range reference signal, wherein the configuration signal is measurable over a range extending beyond the range to adjacent cells;
   establishing, based on the received inquiry information, report information related to a quality of the long-range reference signal; and
   transmitting the established report information to the center cell.

10. A method, comprising: receiving report information related to a quality of a long-range reference signal measurable over a range extending beyond the range to adjacent cells, wherein at least one neighboring cell of a center cell receives a configuration signal indicating usage of the long range reference signal for the report information; and
   evaluating, based on the received report information, at least one network terminal in the center cell.

11. The method according to claim 10, further comprising:
   generating, prior to the receiving, the configuration signal indicating usage of the long-range reference signal; and
   transmitting, prior to the receiving, the generated configuration signal.

12. The method according to claim 11, wherein the configuration signal comprises one of separate orthogonal parts of a resource block for the network terminal and a temporal sequence cycling through a plurality of the network terminals.

13. An apparatus, comprising:
   at least one processor;
   memory storing computer program code;
   wherein the memory storing the computer program code is configured to, with the at least one processor, cause the apparatus to at least:
   receive, by at least one neighboring cell of a center cell, a configuration signal indicating usage of a long-range reference signal measurable over a range beyond that of the range to adjacent cells;
   create, at the at least one neighboring cell attached to a center cell, inquiry information related to an evaluation of at least one network terminal in the center cell; and
   configure for transmission by the at least one neighboring cell, the inquiry information in the long-range reference signal to the at least one network terminal in the center cell.

14. The apparatus according claim 13, wherein the apparatus is further caused to receive the configuration signal from the center cell.

15. The apparatus according to claim 14, wherein the configuration signal comprises one of separate orthogonal parts of a resource block for the network terminal and a temporal sequence cycling through a plurality of the network terminals.

16. The apparatus according to claim 13, wherein the inquiry information comprises at least one of the following: identity information of a management entity having created the inquiry information; selection information for selecting at least one of the at least one network terminal to transmit the report information; and resource information related to a resource by means of which the at least one network terminal is to transmit the report information.

17. The apparatus according claim 16, wherein the inquiry information further comprises an extension for selecting network terminals being in an idle state.

18. The apparatus according to claim 16, wherein the report information further comprises location information of the at least one network terminal.

19. The apparatus according to claim 18, wherein the location information is obtained using one of signal timing advance, neighbor measurements, relative received signal quality and global positioning system information.

20. The apparatus according to claim 13, wherein the apparatus is further caused to receive a configuration signal indicating usage of the long-range reference signal, wherein the inquiry information further comprises an extension for selecting network terminals being in an idle state, and wherein the apparatus is constituted by a node B associated with a center cell of a plurality of cells.

21. The apparatus according to claim 13, wherein at least one of transmitting, receiving, creating, establishing, evaluating, generating, means for obtaining and the apparatus is implemented using a chipset or module.

22. A system, comprising: at least one apparatus according to claim 13; and further configured to receive inquiry information related to an evaluation of at least one network terminal in a long-range signal, establish, based on the inquiry information, report information related to a quality of the long-range reference signal; transmit the report information, receive report information related to a quality of a long-range reference signal; and evaluate, based on the report information, at least one network terminal.

23. An apparatus, comprising:
at least one processor;
memory storing computer program code;
wherein the memory storing the computer program code is configured to, with the at least one processor, cause the apparatus to at least:
receive, in a long-range signal from at least one neighboring cell of a center cell, inquiry information related to an evaluation of at least one network terminal in the center cell, wherein the at least one neighboring cell receives a configuration signal indicating usage of the long range reference signal, wherein the configuration signal is measurable over a range extending beyond adjacent cells; and
establish, based on the inquiry information, report information related to a quality of the long-range reference signal; and transmit the report information to the center cell.

24. The apparatus according to claim 23, wherein the inquiry information comprises at least one of the following: identity information of a management entity having created the inquiry information; selection information for selecting at least one of the at least one network terminal to transmit the report information; and resource information related to a resource by means of which the at least one network terminal is to transmit the report information, and wherein the apparatus is constituted by one of a user equipment and a terminal.

25. At least one apparatus according to claim 23, further configured to receive inquiry information related to an evaluation of at least one network terminal in a long-range signal; establish, based on the inquiry information, report information related to a quality of the long-range reference signal; transmit the report information; receive report information related to a quality of a long-range reference signal; and evaluate, based on the report information, at least one network terminal.

26. An apparatus, comprising:
at least one processor;
memory storing computer program code;
wherein the memory storing the computer program code is configured to, with the at least one processor, cause the apparatus to at least:
receive report information related to a quality of a long-range reference signal that is measurable over a range extending beyond adjacent cells, wherein at least one neighboring cell of the center cell receives a configuration signal indicating usage of the long range reference signal for the report information; and
evaluate, based on the report information, at least one network terminal in the center cell.

27. The apparatus according to claim 26, wherein the apparatus is further caused to: generate the configuration signal indicating usage of the long-range reference signal; wherein transmitting comprises transmitting the configuration signal.

28. The apparatus according to claim 26, wherein the apparatus is constituted by at least one of a node B associated with at least one cell neighboring a center cell and a management entity.

29. The apparatus according to claim 27, wherein the configuration signal comprises one of separate orthogonal parts of a resource block for the network terminal and a temporal sequence cycling through a plurality of the network terminals.

30. At least one apparatus according to claim 26, and further configured to receive inquiry information related to an evaluation of at least one network terminal in a long-range signal; establish, based on the inquiry information, report information related to a quality of the long-range reference signal; transmit the report information, and receive report information related to a quality of a long-range reference signal; and evaluate, based on the report information, at least one network terminal.

* * * * *